(12) United States Patent
Buhlmann

(10) Patent No.: US 10,556,461 B2
(45) Date of Patent: Feb. 11, 2020

(54) METHOD FOR PRODUCING A PRINTING SUBSTRATE AND FOR PRODUCING A DIRECTLY PRINTED DECORATIVE PANEL

(71) Applicant: SURFACE TECHNOLOGIES GMBH & CO. KG, Baruth (DE)

(72) Inventor: Carsten Buhlmann, Rangsdorf (DE)

(73) Assignee: SURFACE TECHNOLOGIES GMBH & CO. KG, Baruth (DE)

( * ) Notice: Subject to any disclaimer, the term of this patent is extended or adjusted under 35 U.S.C. 154(b) by 41 days.

(21) Appl. No.: 15/544,120

(22) PCT Filed: Jan. 25, 2016

(86) PCT No.: PCT/EP2016/051465
§ 371 (c)(1),
(2) Date: Jul. 17, 2017

(87) PCT Pub. No.: WO2016/124433
PCT Pub. Date: Aug. 11, 2016

(65) Prior Publication Data
US 2018/0264874 A1    Sep. 20, 2018

(30) Foreign Application Priority Data
Feb. 3, 2015   (EP) .................................... 15153671

(51) Int. Cl.
*B44C 5/04*       (2006.01)
*B32B 5/02*       (2006.01)
(Continued)

(52) U.S. Cl.
CPC .............. *B44C 5/04* (2013.01); *B32B 5/022* (2013.01); *B32B 7/12* (2013.01); *B32B 21/06* (2013.01);
(Continued)

(58) Field of Classification Search
CPC ............ B32B 5/002; B32B 7/12; B32B 21/06
See application file for complete search history.

(56) References Cited

U.S. PATENT DOCUMENTS

| | | | |
|---|---|---|---|
| 2004/0067703 A1 | 4/2004 | Grunden et al. | |
| 2007/0283648 A1* | 12/2007 | Chen | B41J 3/407 52/313 |

(Continued)

FOREIGN PATENT DOCUMENTS

| | | |
|---|---|---|
| DE | 202005015978 U1 | 2/2007 |
| EP | 1454763 A2 | 9/2004 |

(Continued)

*Primary Examiner* — Dah-Wei D. Yuan
*Assistant Examiner* — Kristen A Dagenais-Englehart
(74) *Attorney, Agent, or Firm* — Harness, Dickey & Pierce, P.L.C.

(57) ABSTRACT

The present disclosure relates to a method for producing a printing subsurface for direct printing for producing a decorative panel, in particular a direct printed decorative panel without a backing layer. In addition, the present disclosure relates to a decorative panel which comprises a printing subsurface produced according to a method according to the disclosure. With the method according to the disclosure it is proposed that for forming the printing subsurface a resin composition comprising a melamine resin and/or a urea resin is applied, which at first is dried under the action of heat and subsequently is treated with UV radiation.

13 Claims, 1 Drawing Sheet

(51) Int. Cl.
  *B32B 38/00*    (2006.01)
  *B32B 27/16*    (2006.01)
  *B32B 27/38*    (2006.01)
  *B32B 7/12*     (2006.01)
  *B32B 21/06*    (2006.01)
  *B32B 21/08*    (2006.01)
  *B32B 27/10*    (2006.01)
  *B32B 27/42*    (2006.01)
  *B32B 29/00*    (2006.01)
  *B44F 9/02*     (2006.01)
  *B44F 9/04*     (2006.01)

(52) U.S. Cl.
  CPC .............. *B32B 21/08* (2013.01); *B32B 27/10* (2013.01); *B32B 27/16* (2013.01); *B32B 27/38* (2013.01); *B32B 27/42* (2013.01); *B32B 29/002* (2013.01); *B32B 38/145* (2013.01); *B32B 2255/10* (2013.01); *B32B 2255/26* (2013.01); *B32B 2255/28* (2013.01); *B32B 2264/102* (2013.01); *B32B 2264/104* (2013.01); *B32B 2270/00* (2013.01); *B32B 2307/4023* (2013.01); *B32B 2307/718* (2013.01); *B32B 2307/75* (2013.01); *B32B 2310/0831* (2013.01); *B32B 2317/16* (2013.01); *B32B 2419/04* (2013.01); *B32B 2451/00* (2013.01); *B32B 2607/00* (2013.01); *B44C 5/0461* (2013.01); *B44F 9/02* (2013.01); *B44F 9/04* (2013.01)

(56) References Cited

U.S. PATENT DOCUMENTS

| | | | |
|---|---|---|---|
| 2010/0159239 A1* | 6/2010 | Nun | B05D 7/08 428/354 |
| 2010/0307675 A1* | 12/2010 | Buhlmann | D21H 27/28 156/272.2 |
| 2011/0217463 A1* | 9/2011 | Oldorff | B05C 1/025 427/209 |
| 2012/0213973 A1* | 8/2012 | Clement | B44C 5/04 428/161 |
| 2013/0078437 A1* | 3/2013 | Symkens | B44C 1/00 428/203 |

FOREIGN PATENT DOCUMENTS

| | | |
|---|---|---|
| EP | 2749413 A1 | 7/2014 |
| WO | WO-2011/045690 A2 | 4/2011 |
| WO | WO-2014/102046 A1 | 7/2014 |

* cited by examiner

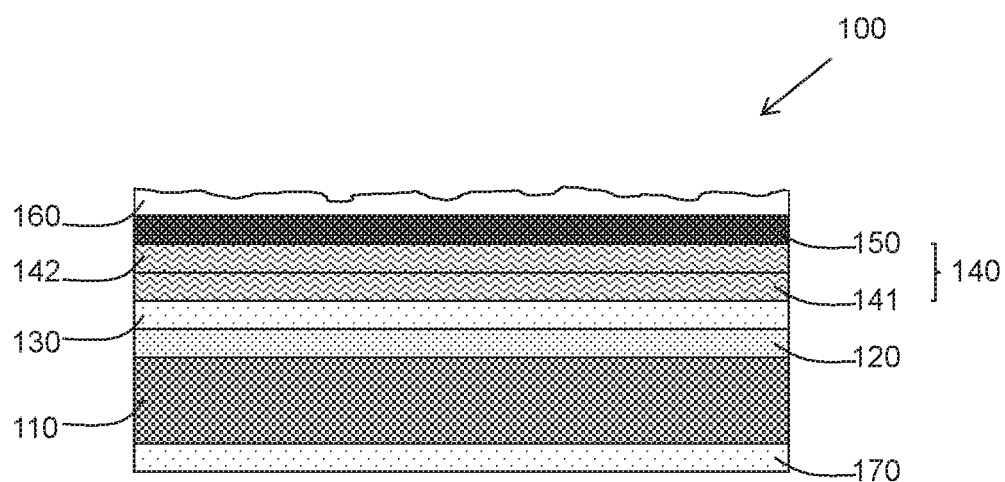

METHOD FOR PRODUCING A PRINTING SUBSTRATE AND FOR PRODUCING A DIRECTLY PRINTED DECORATIVE PANEL

CROSS-REFERENCE TO RELATED APPLICATIONS

This application is a National Stage of International Application No. PCT/EP2016/051465, filed on Jan. 25, 2016, and published in German as WO 2016/124433 A1 on Aug. 11, 2016. This application claims the benefit of and priority to European Patent Application No. 15153671.1, filed on Feb. 3, 2015. The entire disclosures of the above applications are incorporated herein by reference.

FIELD

The present disclosure relates to a method for producing a printing subsurface and a direct printed decorative panel. In addition, the present disclosure relates to a decorative panel which comprises a printing subsurface produced according to a method according to the disclosure. In particular, the application relates to a method for producing a direct printed decorative panel without a backing layer and a decorative panel which has been produced according to the disclosure without a backing layer.

BACKGROUND

This section provides backrgound information related to the present disclosure which is not necessarily prior art.

The term decorative panel in the sense of the disclosure means wall, ceiling, door or floor panels comprising a decoration applied onto a carrier plate. Decorative panels are used in a variety of ways both in the field of interior design of rooms and for decorative claddings of buildings, for example in exhibition stand construction. One of the most common application fields of decorative panels is their use as a floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

Heretofore, such decorative panels have often been produced as laminates in which a decorative paper preprinted with a desired decoration is applied onto a carrier plate and in turn a so-called overlay is applied onto the decorative paper. In order to avoid a deformation of the decorative panels, the so-called cupping, by shrinkage effects of the applied decorative paper subsequently a backing paper is applied on the side of the carrier plate opposite to the decorative paper and the layered structure obtained is fixedly bonded together by use of appropriate pressure and/or heat-activated adhesives. The forces acting on the carrier plate by the backing paper thereby should counteract the tensile forces caused by the cupping.

The application of the backing layer implies a further working step and thus further production costs.

The term "direct printing" in the sense of the disclosure means the application of a decoration directly onto the carrier of a panel or onto an unprinted fiber material layer applied to the carrier. In contrast to conventional methods in which a decorative layer previously printed with a desired decoration is applied onto the carrier, in direct printing the decoration is printed directly in the course of the surface coating or panel manufacturing process. Here, different printing techniques such as flexographic printing, offset printing or screen printing may be used. In particular, digital printing techniques such as inkjet processes or laser printing can be used.

In the sense of the disclosure the term "fiber materials" means materials such as paper and nonwoven fabrics on the basis of plant, animal, mineral or even synthetic fibers as well as cardboards. Examples of fiber materials on the basis of plant fibers in addition to papers and nonwoven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

For protecting the applied decorative layer normally wearing or top layers are applied on top of the decorative layer. A wearing and/or top layer in the sense of the disclosure is a layer applied as an outer border which in particular protects the decorative layer from wear or damage caused by dirt, moisture and mechanical impacts such as abrasion.

It is often intended to introduce a surface structure matching with the decoration in such a wearing or top layer. A surface structure matching with the decoration means that the surface of the decorative panel has a haptically perceivable structure which with respect to its shape and pattern corresponds to the applied decoration in order to achieve a reproduction of a natural material as close to the original as possible even with respect to the haptic.

A problem which may occur during direct printing of decorative panels is that the surface of the decorative panel to be printed is no optimal printing subsurface onto which a corresponding decoration can be applied. This may be the case in direct printing of the carrier as well as in printing a fiber material applied onto the carrier.

Thus, for example, during the production of the decorative panel, such as during the structuring of the top layer by means of a press, the effect may occur that the top layer does not sufficiently adhere to the subsurface and thus the surface is damaged.

When printing a fiber material applied to the carrier a problem may arise that a paper or nonwoven layer applied as a subsurface onto the carrier plate of a decorative panel is penetrated by the resin used for the application in such a way that the resin applied for the attachment soaks through on the side of the paper or nonwoven fabric intended for printing and may lead there to adhesion problems of the printing ink. In order to overcome this problem it may be provided to provide the paper or nonwoven fabric with a barrier layer which prevents the soaking through of the resin. However, such a barrier layer often leads to the fact that the ink applied during the printing does not or not sufficiently penetrate into the paper or nonwoven but remains on the surface which adversely affects the quality of the print. Furthermore, it may be provided that the paper or nonwoven fabric prior to the application onto the carrier plate is provided with a paint receiving layer on the side to be printed which subsequently is printed. The thus prepared decoration paper is then applied onto the carrier plate. During the subsequent application of a top or wearing layer then adhesion problems may occur, so that the final laminate composite does not have sufficient stability and, for example, a splitting of the laminate in the decoration paper layer may occur.

SUMMARY

Taking this into consideration, it is the object of the present disclosure to provide a method for producing a printing substrate for direct printing onto a decorative panel, which may overcome at least one problem known from the prior art. In addition, it is the object of the disclosure to provide a decorative panel comprising a corresponding printing subsurface.

Preferred embodiments of the disclosure are described in the dependent claims and in the further description, wherein the further described features individually or in any combination may be part of the disclosure inasfar the contrary is not explicitly derived from the context.

According to the disclosure, a method for producing a printing subsurface for direct printing for producing a decorative panel is proposed, comprising the steps:

a) providing a plate-shaped carrier;

b) optionally applying a resin layer onto the plate-shaped carrier;

c) optionally applying a paper or nonwoven layer onto the plate-shaped carrier; and d) optionally calendering the resulting layered structure, in particular at a temperature between ≥40° and ≤250° C., wherein the method is characterized in that:

the method comprises the further process steps:

e) applying at least one resin composition comprising at least one resin selected from the group consisting of a melamine resin and a urea resin;

f) drying the resin composition applied in process step (e) under the influence of heat; and g) subsequently treating the resin composition applied in process step e) and dried in process step f) by UV radiation, wherein in process step e) a successive twofold application of respectively one resin composition is carried out in order to form two resin-containing layers.

Surprisingly, it has been found that by means of the above-described method, a printing subsurface for direct printing can be produced which allows an excellent print image and further brings about process related advantages.

Thus, it has surprisingly been found that in particular the treatment of the dried melamine resin-containing and/or urea resin-containing resin layer by UV radiation can produce an improved print image. Thus, by means of the above-described processes particular high-quality products can be produced. Herein, the printing subsurface provided according to the disclosure is suitable both for flexographic printing, offset printing or screen printing processes as well as in particular for digital printing techniques such as inkjet processes or laser printing processes.

Moreover, the above-described method enables in a particularly advantageous manner the production of an intermediate product which prior to the actual printing compared to the solutions known from the prior art has a significantly improved storability. In detail, the carriers produced and/or treated as described above can be stacked to a larger stacking height compared with the solutions of the prior art without the occurrence of a negative interference of the printing subsurface or the surface to be printed with respect to a mechanical impact or deteriorated printability.

Without being bound to theory it is believed that a treatment of the dried resin layer, in particular a melamine resin layer, with UV radiation, despite of the otherwise known thermal curing of the resin initiates an at least partial further curing of the resin layer, such as, without being limited thereto, by curing of carbonyl groups still present, wherein the advantages of the method are not necessarily based on the above-described effect.

The carrier provided according to method step a) can be used in a manner known per se for the production of decorative panels. Depending on the desired application field of the decorative panels the carrier may be made of different materials. In particular, the material of the carrier can be selected depending on the application field. For example, the carrier can consist of or comprise a wood-based material, provided that the decorative panel is not exposed to excessive moisture or weather conditions. If, however, the panel is used e.g. in wet rooms or in the outdoor area, the carrier can for example be made from or comprise a plastic material.

Wood-based materials in the sense of the disclosure in addition to solid wood materials are materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

Plastic materials which can be used for producing corresponding panels are, for example, thermoplastic plastic materials such as polyvinyl chloride (PVC), polyolefines (such as polyethylene (PE), polypropylene (PP)), polyamides (PA), polyurethanes (PU), polystyrene (PS), acrylonitril butadiene styrene (ABS), polymethyl methacrylate (PMMA), polycarbonate (PC), polyethylene terephthalate (PET), polyether ether ketone (PEEK) or mixtures or co-polymerizates thereof. For example, a co-polymerizate of polyethylene and polypropylene may be used in a ratio of 1/1. Moreover, as an example a wooden material and a polymer may be suitable, which may be present in a ratio of 40/60 to 70/30, such as 50/50. As polymeric components polypropylene, polyethylene or a copolymer of the two aforementioned materials can be used, wherein further wood flour may be used as a wooden component. The plastic materials can basically include common fillers, such as calcium carbonate (chalk), alumina, silicagel, quartz powder, wood flour, gypsum. In addition they can be coloured in a known way.

Herein, the present method can be carried out by applying the resin layer according to process step e) according to one embodiment directly onto the carrier provided according to process step a). Herein, the application can be carried out in a manner known per se by pouring devices or by use of application rollers. The resin composition can, for example, be applied with a coating amount between ≥5 $g/m^2$ and ≤50 $g/m^2$, preferably ≥10 $g/m^2$ and ≤40 $g/m^2$. According to a further embodiment the resin composition, for example the same resin composition, can also be applied in at least two application steps or two application layers.

After the application of the resin composition in process step e) a drying step is carried out in process step f) in which at least the surface of the resin-containing layer is at least partly dried. For this purpose, it may be provided that on the surface onto which the resin composition has been applied a surface temperature between ≥75° C. and ≤125° C., preferably between ≥80° C. and ≤110° C., in particular between ≥90° C. and ≤100° C. is produced. In order to create a corresponding surface temperature, for example, IR emitters, NIR emitters, nozzle driers or similar devices are suited. Said surface temperature is preferably adjusted for a period between ≥1 s and ≤600 s, preferably between ≥5 s and ≤400 s, more preferably between ≥10 s and ≤300 s.

Subsequently to the drying process in accordance with process step f) in the method described above subsequently a treatment of the resin composition applied in process step e) and dried in process step f) by means of UV radiation is implemented.

Herein UV radiation can in particular be understood as a radiation having a wavelength in the range of, for example, 10-380 nm, such as 100-380 nm. Here, this kind of radiation can, for example, be generated in a manner known per se by use of medium pressure lamps. For example, a gas discharge lamp such as a mercury vapor lamp can be used.

A suitable power or radiation intensity of the irradiation, in particular on the surface of the irradiated substrate can, for example be in a range of ≥100 W/cm to ≤200 W/cm, preferably ≥110 W/cm to ≤170 W/cm, for example ≥120 W/cm to ≤160 W/cm, such as 145 W/cm.

For example, one radiation source or a plurality of radiation sources can be used, which for example may be disposed in succession in the transport direction of the carrier. In an exemplary wavelength range of 230-410 nm and by use of three series-connected radiators, for example each with a power of 145 W/cm, the total dose can be adjusted to a range of ≥400 $mJ/cm^2$ to ≤1200 $mJ/cm^2$, in particular ≥600 $mJ/cm^2$ to ≤1000 $mJ/cm^2$, such as ≥700 $mJ/cm^2$ to ≤900 $mJ/cm^2$, exemplarily 830 $mJ/cm^2$.

For this purpose, for example, when using three series-connected UV emitters a retention time in the direct focus of the radiator, which according to the moving direction of the carrier may have a range of approximately 10 mm, may be about 0.024 s, wherein the retention time within an extended focus, which according to the moving direction of the carrier may have a range of approximately 50 mm may be about 0.12 s.

In principle, total irradiation durations which may include both the direct focus and the extended focus, may be in a range of ≥0.05 s to ≤20 s, preferably ≥0.1 s to ≤2 s, such as ≥0.2 s to ≤0.5 s. In order to achieve the above values, for example, a velocity of the carrier can be adjusted to, for example, 25 m/min.

The thus treated plate or the carrier with the applied printing subsurface can subsequently be directly printed, in particular by use of flexographic printing, offset printing or screen printing processes, as well as in particular by means of digital printing techniques such as, for example, inkjet processes or laser printing processes. As an alternative, the carrier together with the printing subsurface can be stored as an intermediate product or as a pre-product and later be taken from the stock and be printed.

As an alternative to the above-described direct printing of the carrier or the application of the printing subsurface directly onto the carrier, it may further be provided that a paper or nonwoven layer is provided with the printing subsurface and is subsequently printed. In this case, following process step a) according to process step b) a resin layer is applied onto the plate-shaped carrier which may serve as an adhesive for fixing the paper or nonwoven layer. In this case a resin composition known per se can be used. Further, this process step can again be implemented by use of application rollers.

Subsequently, according to process step c), the paper or nonwoven layer is applied onto the plate-shaped carrier or onto the resin layer, whereupon according to process step d) calendering of the resulting layer structure, in particular at a temperature between ≥40° and ≤250° C. is carried out. Herein, this step can be carried out in a basically known manner by a process of layer construction by means of a calender comprising calender rolls which treat the layer structure with pressure and/or heat.

In the event that the process involves the application of a paper or nonwoven and thus, for example, the process steps b) to d), the application of a melamine resin-containing resin composition or at least one resin-containing or melamine resin-containing layer is carried out according to method step e) subsequently to the calendering process according to process step c).

In the method according to the disclosure both the application of a resin composition onto the plate-shaped carrier according to process step b) as well as the application of a resin composition onto the plate-shaped carrier according to process step e) and the application of a resin composition onto the paper or nonwoven applied onto the plate-shapes carrier are carried out subsequently to the calendering process by means of application rollers, a spraying device, knife coating, blade coating, airbrushes, cast line devices, slot dies, curtain coating or other suitable devices.

It is in particular provided that in process step e) a successive twofold application of a respective resin composition takes place in order to form two resin-containing layers. Surprisingly, it has been found that the aforementioned advantages can be achieved in particular with a two-layered resin coating or with two resin-containing layers. Thus, in particular when, in contrast to the solutions from the prior art, a two-layered structure of the resin layer is built up a particularly advantageous printing subsurface can be produced.

In this regard, it is preferable if at least one layer of the two, i.e. of the at least two, resin-containing layers includes a melamine resin. Preferably both of the two resin-containing layers can include a melamine resin, for example, as the only resin component.

Alternatively or additionally it can be provided that at least one layer of the two, i.e. the at least two, resin-containing layers includes a urea resin. For example, both of the two resin-containing layers may include a urea resin, for example as the only resin component.

For example, it may be advantageous that at least one layer, for example the first applied layer, or both applied resin-containing layers, include a mixture of melamine resin and urea resin, for example as the only resin components.

In a preferred embodiment, in process step e) a successive twofold application of respectively one resin composition can be carried out in order to form of two resin-containing layers by use of the process steps:

e1): forming a first resin-containing layer by use of a resin composition including a mixture of melamine resin and urea resin; and e2): forming a second resin-containing layer by use of a resin composition comprising a proportion of melamine resin in the resin content within a range of ≥95 wt.-%, in particular ≥99 wt.-%.

Surprisingly, it has been found that the abovementioned advantages can be achieved in particular with a two-layered resin coating or with two resin-containing layers. Herein, it could in particular be found that the successive application of a first resin-containing layer comprising a mixture of melamine resin and urea resin and a second resin-containing layer disposed on the first resin-containing layer having a resin content in a range of ≥95 wt.-%, in particular ≥99 wt.-%, for example 100 wt.-%, melamine resin, brings about the above-described advantages in a particularly pronounced way. In particular, the second applied resin-containing layer, which is applied according to process step e2) can be free of urea resin.

The respective resin composition can basically comprise, for example, a resin content between ≥15 wt.-% and ≤95 wt.-%, preferably between ≥20 wt.-% and ≤90 wt.-%, more preferably between ≥25 wt.-% and ≤65 wt.-%.

Herein, the first resin-containing layer can be applied in process step e1) with a mixture which comprises exclusively melamine resin and urea resin in the resin portion. Herein, melamine resin may be present in the resin portion, for example, in a range of ≥55 wt.-% to ≤90 wt.-%, for example ≥60 wt.-% to ≤80 wt.-%, such as 70 wt.-%, wherein the remaining proportion of the resin portion may respectively be formed of urea resin.

Alternatively, it may be provided that melamine resin is present in the resin portion, for example, in a range of ≤55 wt.-% to ≥0 wt.-%, or that melamine resin is present in the resin portion in a proportion of ≥90 wt.-%, such as up to 100 wt.-%, wherein the optional remaining proportion of the resin portion can respectively be formed of urea resin. This can basically be applied to both resin-containing layers.

Further, it may be provided that urea resin is present in the resin portion in an amount of ≥10 wt.-% to ≤45 wt.-%. Alternatively, it may be provided that urea resin is present in the resin portion, for example, in a range of ≤10 wt.-% to ≥0 wt.-%, or that urea resin is present in the resin portion in range of ≥45 wt.-% up to 100 wt.-%, wherein the optionally remaining proportion of the resin portion can respectively consist of melamine resin. This can basically apply to both applied resin-containing layers.

The above-described advantages can particularly strongly be pronounced in a preferred embodiment if the first resin-containing layer is applied according to method step e1) in an amount which is smaller than the amount of the second resin-containing layer applied according to process step e2). For example, the first resin-containing layer can be applied in process step e1) in an amount within a range of ≥10 g/m$^2$ to ≤25 g/m$^2$, for example in a range of ≥15 g/m$^2$ to ≤20 g/m$^2$, and the second resin-containing layer can be applied in process step e2) in an amount within a range of ≥20 g/m$^2$ to ≤40 g/m$^2$, for example in a range of ≥25 g/m$^2$ to ≤35 g/m$^2$.

In a further preferred embodiment at least one resin composition applied in process step e) may comprise between ≥0.5 wt.-% and ≤85 wt.-%, preferably between ≥1.0 wt.-% and ≤80 wt.-%, of a solid having a mean grain diameter $d_{50}$ between ≥0.1 μm and ≤120 μm. In the case of the provision of two resin-containing layers both layers, the first layer or in particular preferably the second, i.e. outer, resin-containing layer, may include a corresponding solid. Surprisingly, it has been found that the application of a printing subsurface including a corresponding solid content, in particular, but not exclusively, subsequently to the calendering process of an unprinted paper or nonwoven layer, is suitable to provide an outstanding appropriate surface suited for a subsequent direct printing process which, moreover, has a very good adhesion to a subsequently applied top or wearing layer, so that a laminate formed by use of the method according to the disclosure has a high stability. Here, the mentioned solid content of the resin composition refers to the liquid resin composition. According to the disclosure, in particular in an application of a paper or nonwoven layer it may be provided that the resin composition applied after the calendering process at least partially penetrates into the applied paper or nonwoven layer to such an extent that the resin composition soaks through to the plate-shaped carrier or the resin layer applied thereto. Moreover, it has surprisingly been found, that by means of such a manufacturing method the application of a backing layer for avoiding the cupping of the decorative panel can be dispensed with. This leads to distinct economic advantages, since on the one hand the corresponding working step can be dispensed with, and on the other hand corresponding material savings result.

Herein, it may be preferred that in least one resin composition applied in process step e) a resin composition is applied which includes as a solid at least one compound of the group consisting of titanium dioxide, barium sulfate, barium oxide, barium chromate, zirconium(IV)oxide, silicium dioxide, aluminum hydroxide, aluminum dioxide, iron oxide, iron(III)hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose fibers or mixtures thereof. By using such solid materials in particular a coloured printing subsurface can be provided the colouring of which has a property supporting the decoration printing process. For example, in a decorative design which is to represent a dark wood species, a printing subsurface with a brown or brownish base tone can be applied, while in a decorative design that is to represent a light wood species or a light-colored stone, a printing subsurface with a yellow or white base tone can be applied. The use of cellulose fibers in the resin composition applied to the plate-shaped carrier has, in particular, the beneficial effect that any irregularities on the carrier plate surface onto which the resin composition is applied have no impact on the surface to be printed later, resulting in a significant improvement of the print image. Such irregularities may, for example, be grinding grooves resulting from grinding of the carrier plates or impressions caused by conveyor means, such as conveyor belts, etc. When cellulose fibers are used they preferably have a grain size in the range between ≥10 μm and ≤100 μm, in particular between ≥25 μm and ≤90 μm. The proportion of the cellulose fibers in the solid material included in the resin composition may, for example, be in a range between ≥0 wt.-% and ≤100 wt.-%, preferably between ≥40 wt.-% and ≤100 wt.-%, in particular between ≥60 wt.-% and ≤100 wt.-%. Here, the preferred proportion of solid materials in the resin composition in the case of using cellulose fibers is at the lower end of the wt.-% range, preferably between 0.5 wt.-% and 3.5 wt.-%, in particular between 1.0 wt.-% and 2.5 wt.-%, whereas the preferred proportion of solid materials in the resin composition listed as suitable examples of other solid materials is preferably between ≥5 wt.-% and ≤85 wt.-%, preferably ≥10 wt.-% and ≤80 wt.-%, more preferably between ≥35 wt.-% and ≤75 wt.-%. This is particularly due to the low specific weight of the cellulose fibers which can be added as solid material compared to the specific weight of the other solid materials listed.

In particular, it can be provided according to the present disclosure that in at least one resin composition applied in process step e) a resin composition is applied, which includes at least one organic or inorganic pigment selected from the group consisting of Prussian blue, brilliant yellow, cadmium yellow, cadmium red, chromium oxide green, cobalt blue, cobalt coelin blue, cobalt violet, irgazine red, iron oxide black, manganese violet, phthalocyanine blue, sienna, titanium white, ultramarine blue, ultramarine red, umber, kaolin, zirconium silicate pigments, monoazo yellow and monoazo orange, thioindigo, beta-naphthol pigments, naphthol AS pigments, pyrazolone pigments, N-acetoacetic acid anilide pigments, azo metal complex pigments, diaryl yellow pigments, quinacridone pigments, diketopyrrolo-pyrrole pigments (DPP), dioxazine pigments, perylene pigments, isoindolinone pigments, copper phthalocyanine pigments, and mixtures thereof.

Furthermore, in one embodiment of the method it can be provided that in at least one resin composition applied in process step e) a resin composition is applied which includes a curing agent, wherein the curing agent is included in the resin composition, for example, in a concentration between ≥0.05% and ≤3.0 wt.-%, preferably ≥0.15 wt.-% and ≤2.0 wt.-%, more preferably between ≥0.5 wt.-% and ≤2.0 wt.-%. The provision of a curing agent in the resin composition enables to optimize the setting or curing behavior of the resin composition depending on the paper applied onto the plate-shaped carrier and/or, moreover, to provide a particularly rapid provision of the printing subsurface which can be advantageous in particular when a printing process is carried out directly after the application of the printing subsurface.

According to one embodiment of the method the curing agent can, for example, include a solution of organic salts. The curing agent preferably has an acidic pH value, preferably between ≥pH 0.5 and ≤pH 7, preferably ≥pH 0.5 and ≤pH 6.

In a particularly preferred embodiment of the disclosure, a so-called latent curing agent is used as a curing agent. Latent curing agents are characterized in that after their addition to the resin on the one hand a sufficient processing time at room temperature, and on the other hand a curing time as short as possible is achieved at the subsequent processing temperatures. The effect of the latent curing agents is due to the fact that they are ineffective at normal temperatures and only at increased temperatures or due to a chemical reaction they release an acid, which accelerates the curing process. Examples of latent curing agents are inter alia alkyl or alkanolamine salts of sulfuric acid, amidosulfonic acid, 3-chloro-1,2-propanediol, p-toluenesulfonic acid, morpholine, ammonium sulfate, ammonium chloride, ammonium sulfite, ammonium nitrate, ethanolamine hydrochloride, dimethylethanolammonium sulfite, diethanolammonium sulfamate or maleic acid.

In particular, the curing agent may be an aqueous, preferably nonionic solution. An example of a suitable curing agent is MH-180 B (Melatec AG, Switzerland).

According to a preferred embodiment of the method it may in particular be provided that in at least one resin composition applied in process step e) a resin composition having a viscosity corresponding to a flow time between ≥7 s and ≤60 s from a standard flow cup is applied. The viscosity is determined in accordance with DIN 53211 using a flow cup with a discharge nozzle width of 4 mm.

At least one, for example all resin compositions applied in process step e) in addition to the components mentioned above may comprise further components or additives such as rheological agents for adjusting the viscosity, water, flow improvers, preservatives, surfactants, antifoaming agents or the like.

According to a further preferred embodiment of the method, a curing agent is applied onto the plate-shaped carrier prior to the application of the resin layer in step b). In this case, more preferably, an acidic curing agent, for example having a pH-value between pH ≥0.5 and <pH 7, preferably >pH 0.5 and ≤pH 6 is applied onto the plate-shaped carrier. The curing agent is reactive against or influences the curing reaction of the resin composition to be applied subsequently by means of which a paper or nonwoven layer is to be attached to the plate-shaped carrier.

Further, it may be provided that after the application of the curing agent onto the plate-shaped carrier in step b) a heat treatment is carried out, by means of which the temperature of the surface of the plate-shaped carrier is increased, preferably to a temperature between ≥35° C. and ≤90° C. Such a heat treatment can, for example, be implemented by means of IR emitters or NIR (near-infrared) emitters.

For applying the resin layer in step b) it may be preferably provided that a resin composition is applied which as a resin component comprises at least one compound selected from the group consisting of melamine resin, formaldehyde resin, urea resin, phenol resin, epoxy resin, unsaturated polyester resin, diallyl phthalate or mixtures thereof. The resin composition may, for example, be applied at an area density between ≥5 g/m$^2$ and ≤50 g/m$^2$, preferably ≥10 g/m$^2$ and ≤40 g/m$^2$. Particularly preferably, the area density of the resin composition is selected so that the paper or nonwoven applied in the subsequent step c) is not fully impregnated with the resin composition. To this end, for example, it may be also provided that the resin composition in step b) is applied with a kinematic viscosity corresponding to a flow time between ≥10≤s and 40 s from a standard flow cup (as measured according to DIN 53211).

According to a further embodiment of the method in step c) a paper or nonwoven with a grammage between ≥30 g/m$^2$ and ≤80 g/m$^2$, preferably between ≥40 g/m$^2$ and ≤70 g/m$^2$ is applied onto the plate-shaped carrier. This, for example, can be realized by use of suitable feed rollers which guide the paper or nonwoven in such a way that it is disposed onto the carrier.

According to one embodiment of the method a backing layer is applied on the side opposite to the decorative side. Herein, it is particularly preferred that the backing layer is applied in a common calendering step with the paper or nonwoven onto the decorative side.

In a further embodiment of the disclosure it may be provided that a backing layer is applied to the side of the plate-shaped carrier opposite to the decorative layer only after the application of the decorative image. Herein, it may be particularly provided that the backing layer is applied as a top and/or wearing layer in a common step together with the application of an overlay.

However, in particular it is preferred in the context of the disclosure, if the application of a backing layer is dispensed with. Indeed, it has been shown surprisingly that by means of such a production method the application of a backing layer can be dispensed with, while cupping of the decorative plate is avoided. This leads to significant economic benefits, because on the one side the corresponding process step can be eliminated and on the other side corresponding material savings are achieved.

After the application of the printing subsurface onto the decorative side a decorative layer can be applied onto the printing subsurface according to process step h) by means of suitable printing techniques, wherein flexographic printing, offset printing or screen printing processes and in particular digital printing techniques such as inkjet processes or laser printing processes are suitable.

Preferably, a radiation curable paint and/or ink is used for applying the decorative layer by means of direct printing techniques. Radiation curable in the sense of the disclosure means that the paint and/or ink is cured by means of electromagnetic radiation such as UV radiation or electron beam radiation. Herein, it may be particularly provided that the paint and/or ink includes corresponding components polymerizing radiation or photo induced. Examples of suitable components are acrylates, epoxides or cyclic amines, such as ethylene imine.

In order to protect the applied decorative layer according to the further process step i) a wearing or top layer can be applied in a subsequent process step on top of the decorative layer which in particular protects the decorative layer from wear or damage caused by dirt, moisture or mechanical impacts such as abrasion. Particularly in the application of a wearing or top layer a further advantage of the above-described production of the printing subsurface is achieved. In detail, the adhesion of the wearing or top layer to the printed printing subsurface can be significantly improved such that a particularly good stability and durability are enabled and moreover chipping during a pressing process for introducing a structure, as described below, in particular in a short-cycle press (KT press) can be prevented.

With respect to the wearing or top layer it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. Herein, it may be provided that the hard material is included in the wearing layer composition in an amount between 5 wt.-% and 40 wt.-%, preferably between 15 wt.-% and 25 wt.-%. The hard material preferably has a mean grain diameter between 10 µm and 250 µm, more preferably between 10 µm and 100 µm. In this way in a preferable way it is achieved that the wearing layer composition forms a stable dispersion and a decomposition or precipitation of the hard material within the wearing layer composition can be avoided. For forming a corresponding wearing layer in one embodiment of the disclosure it is provided that the radiation curable composition including the hard material is applied at a concentration between 10 $g/m^2$ and 300 $g/m^2$, preferably between 50 $g/m^2$ and 250 $g/m^2$. In this case, the application can be implemented, for example, by means of rollers such as rubber rollers, or by means of pouring devices. In a further embodiment of the disclosure it may be provided that the hard material is not included within the wearing layer composition at the time of application of the wearing layer composition, but is scattered in the form of particles onto the applied wearing layer composition and subsequently the wearing layer is cured radiation induced.

Moreover, it can be provided that in the wearing or top layer a surface structure matching with the decoration is introduced. Herein, it may be provided that the carrier plate already has a structure and an alignment of a printing tool for applying the decoration with respect to the carrier plate is implemented depending on the structure of the carrier plate which is detected by means of optical methods. Herein, for aligning the printing tool and the carrier plate relative to each other it can be provided that a relative movement between the printing tool and the carrier plate necessary for the alignment is implemented by shifting the carrier plate or by shifting the printing tool.

According to a further embodiment of the disclosure it is provided that a structuring of the decorative panels is implemented subsequently to the application of the top and/or wearing layer. To this end, it may be preferred to apply a settable composition as the top and/or wearing layer and a curing process is implemented only to such an extent that only a partial curing of the top and/or wearing layer is achieved. In the thus partially cured layer by means of appropriate tools, such as a hard metal texture roller or a die or a press, such as a short-cycle press, a desired surface structure is embossed. Herein, the embossing process is implemented in correspondence with the applied decoration. In order to ensure a sufficient correspondence of the structure to be produced with the decoration it may be provided that the carrier plate and the embossing tool are aligned relative to each other by corresponding relative movements. Subsequently to the introduction of the desired structure within the partially cured top and/or wearing layer a further curing step is implemented with respect to the now structured top and/or wearing layer.

Moreover, it can be provided that the wearing and/or top layer is applied as a radiation curable or at least partially radiation curable composition, for example based on an acrylic varnish, an epoxy varnish or a urethane acrylate. Herein, it may be particularly preferred that the composition after the application onto the decorative layer is only partially cured radiation induced and a surface structure matching with the decoration is introduced into the partially cured layer in the manner described above.

According to a further embodiment of the disclosure the top and/or wearing layer can comprise an agent for reducing the static (electrostatic) charging of the finished laminate. For example, it may be provided that the top and/or wearing layer comprises compounds such as choline chloride. Herein, the antistatic agent may, for example, be included in the composition for forming the top and/or wearing layer at a concentration between ≥0.1 wt.-% and ≤40.0 wt.-%, preferably between 1.0 wt.-% and ≤30.0 wt.-%.

In a further embodiment of the method according to the disclosure it can be provided that the structure is produced in the course of the printing process. For this purpose, it may be provided, for example, that a multiple paint application is implemented in such a way that raised areas are created on the printing subsurface which result in a desired three-dimensional structure. On top of the structure thus produced a wearing and/or top layer can be applied.

With respect to further advantages and technical features of the method it is explicitly referred to the following explanations with respect to the panel and vice versa.

Moreover, according to the present disclosure a directly printed decorative panel is proposed comprising a plate-shaped carrier, optionally a resin layer applied onto the plate-shaped carrier and optionally a layer of a non-impregnated and in particular unprinted paper or nonwoven, wherein a decorative panel further includes a carrier or a printing subsurface applied onto the paper or nonwoven layer, a paint or decoration layer applied onto the printing subsurface and a top and/or wearing layer applied at least onto the paint layer, wherein the printed panel is characterized in that the printing subsurface is formed of two resin-containing layers.

Herein it may be particularly preferred that the first resin-containing layer comprises a mixture of melamine resin and urea resin and that the second resin-containing layer which is in particular applied onto the side of the carrier opposite of the first resin-containing layer comprises ≥95 wt.-%, in particular ≥99 wt.-%, such as 100 wt.-% melamine resin.

In this case, the panel can optionally comprise a printed paper or nonwoven layer onto which the printing subsurface is applied, or the printing subsurface can be applied directly onto the carrier. In particular, such a directly printed panel can include the advantages of an improved manufacturability, wherein with respect to the method and the features it is referred to the above-described statements on the method.

Herein, such a panel may, for example, also have the advantage that a pre-product or an intermediate product is enabled which can be stored in a particular advantageous way and is provided with a printing subsurface but has not yet been printed, and correspondingly also has no wearing or top layer. Such a pre-product can comprise a plate-shaped carrier, optionally a resin layer applied onto the plate-shaped carrier and optionally a layer of an in particular non-impregnated and unprinted paper or nonwoven, wherein the pre-product further comprises a printing subsurface applied onto the carrier or onto the paper or nonwoven layer, wherein the printing subsurface is formed from two resin-containing layers, in particular wherein the first resin-containing layer comprises a mixture of melamine resin and urea resin, and in particular wherein the second resin-containing layer which is in particular disposed on the first resin-containing layer or on the side of the first resin-containing layer facing away from the carrier comprises ≥95 wt.-%, in particular ≥99 wt.-%, for example 100 wt.-%, melamine resin in the resin portion.

In a preferred embodiment, the printing subsurface can be composed of at least one resin composition which includes between ≥0.5 wt.-% and ≤85 wt.-%, preferably between ≥1.0 wt.-% and ≤80 wt.-% of a solid having a mean grain diameter $d_{50}$ between ≥0.1 μm and ≤120 μm.

In a further preferred embodiment of the decorative panel according to the disclosure the decorative panel comprises a backing layer on the side of the plate-shaped carrier opposite to the printed side. However, it may be further preferred that no backing layer is provided on the side of the plate-shaped carrier opposite to the printed side. Such a backing layer free panel due to the material and working step savings can in particularly be produced more cost-efficiently and thus offers also economic advantages in addition to ecological advantages of resource conservation.

According to another embodiment of the disclosure the plate-shaped carrier can comprise a profile at least in an edge region. Here, it may be in particular provided that the decoration is applied also in the region of the profile, such that the profiling process is implemented prior to the application of the decorative layer onto the plate-shaped carrier. Alternatively or in addition a profiling process can also be implemented subsequently to the application of the decorative layer. In profiling in the sense of the disclosure it is provided that by means of suitable machining tools at least in a portion of the edges of the decorative panel a decorative and/or functional profile is introduced. Here, a functional profile, for example, means the introduction of a groove and/or tongue profile in an edge in order to make decorative panels connectable to each other by means of the introduced profiles. A decorative profile in the sense of the disclosure, for example, is a chamfer formed at the edge region of the decorative panel, for example, in order to simulate a joint between two interconnected panels after their connection, such as for example in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one step, while the functional profile, e.g. groove/tongue, is produced in a subsequent step.

By means of the application of the decoration subsequently to the at least partially profiling of the carrier, for example, by means of the above-described methods, such as direct printing, abrasion or damage of the decoration in the course of the profiling process can be avoided in an advantageous way. Thus, the decoration also in the regions of the profile corresponds in detail to the desired imitation, for example, of a natural material.

According to a further embodiment of the disclosure the applied top and/or wearing layer can comprise means for reducing the static (electrostatic) charging of the finished laminate. For example, it may be provided that the top and/or wearing layer to this end comprises compounds such as choline chloride. As an alternative as antistatic agents in the top and/or wearing layer also amines such as quaternary amines, in particular alkylamines, may be used. Preferred amines may, for example, include (3-lauramidopropyl)trimethylammonium methylsulfate. Herein, the antistatic agent can, for example, be applied or introduced in a solvent which does not interfere or negatively influence the properties of the top layer, or which can be removed easily from the top layer such as by evaporation. To this end, for example, an alcohol such as 2-butoxyethanol is suited.

The abovementioned antistatic compounds can basically be provided as described above in a top or wearing layer or protective layer of a panel, irrespective of the exact structure and, for example, independently of the printing subsurface described herein. However, in particular in the case of a previously described panel comprising the above-described printing subsurface the above-described antistatic agents may be advantageous in order to effectively prevent an antistatic charging of the panel.

With regard to the top layer it may further be provided that this layer comprises a varnish. Furthermore, the varnish can have a plurality of layers, wherein, for example, a base coat varnish and subsequently a top coat varnish forming the surface can be provided. Herein, basically a curing agent can be added to the varnish so as to provide for a curing process in the desired manner.

For example, after the application of the decoration a base coat varnish may be applied, for example by use of a roller. Such a base coat varnish can, for example, include an acrylic-based varnish, or the varnish may comprise an acrylate resin. As such it can, for example, be applied in an organic solvent or as an aqueous solution and may comprise fillers and/or pigments. In order to achieve a particularly good processability as a base coat varnish a varnish can be applied which, for example, has a viscosity in a range from ≥25 mm$^2$/s to ≤45 mm$^2$/s, such as in a range from ≥30 mm$^2$/s to ≤40 mm$^2$/s, for example 36.0 mm$^2$/s, which can be determined according to DIN 51562-1, for example from ≥70 to ≤100 s ISO4 mm/20° C. (DIN EN ISO 2431). Furthermore, for a particularly good processability and good mechanical properties of the finished varnish a varnish can be applied as a base coat varnish which has a density, for example, in a range from ≥0.7 g/cm$^3$ to ≤1.4 g/cm$^3$, such as in a range from ≥0.9 g/cm$^3$ to ≤1.2 g/cm$^3$, for example 1.050 g/cm$^3$, which can be determined at 20° C. by weight measurement of the corresponding volume. Furthermore, the base coat varnish during the application may have a flow time of >0.0/4 s at 20° C. according to ISO 2431. Here, the above values refer to the varnish including any further ingredients such as, for example, fillers. For example, the varnish sold under the product name HH60-0001 by the company BASF Coatings GmbH can be used as a base coat varnish.

In the base coat varnish abrasion-resistant particles may be introduced for the purpose of improving the abrasion resistance. Such particles are known per se and can, for example, include corundum or other materials as described above in detail.

Furthermore, a curing agent can be provided in the base coat varnish. As such, in principle any curing agent which is advantageous for the varnish component may be used. For example a polyisocyanate, for example based on hexamethylene diisocyanate can be used. The curing agent used may, for example, have a density in a range from ≥0.8 g/cm$^3$ to 1.5 g/cm$^3$, such as in a range from 1.1 g/cm$^3$ to ≤1.3 g/cm$^3$, for example of 1.2 g/cm$^3$, which can be determined by weight measurement of the corresponding volume at 20° C. Furthermore, the curing agent may have a viscosity of more than 100/6 s at 20° C. according to ISO 2431. For example, the curing agent sold under the product number SC21-0001 1100 by the company BASF Coatings may be used.

For example, as a base coat varnish a varnish can be applied which in addition to the main varnish component includes abrasion-resistant particles, such as corundum, a curing agent and optionally a diluent such as water. Here, the pure varnish can constitute for example 100 parts by weight, the abrasion-resistant solid can constitute about 35-50 parts by weight, the curing agent can constitute about 7 parts by weight and the diluent can constitute about 0-5 parts by weight. As a solid content for example 46 wt.-% can be advantageous. The aforementioned parts by weight can each differ for example up to 20 wt.-%, such as up to 10 wt.-%, from the abovementioned values.

The top layer provided in the finished panel or the corresponding varnish layers are, as known to a person skilled in the art, dried and cured, such that possibly included solvents which are present in the varnish layers during the application have been removed.

In principle, an application quantity of 45-55 g/m$^2$ can be suitable for the base coat varnish.

The base coat varnish may, for example, serve as a primer for a top coat varnish, which may be applied onto the base coat varnish.

For example, a top coat varnish can be applied after the application of the base coat varnish such as by use of a roller. Such a top coat varnish can, for example, be based on an amino resin or the top coat varnish may include an amino resin. For example, the top coat varnish may be applied in an organic solvent or as an aqueous solution and include fillers and/or pigments. For a particularly good processability as a top coat varnish a varnish can be applied which has a viscosity, for example, in a range from ≥550 mm$^2$/s to ≤800 mm$^2$/s, such as in a range from ≥650 mm$^2$/s to ≤740 mm$^2$/s, for example 691.3 mm$^2$/s, which can be determined according to DIN 51562-1, wherein, for example, a viscosity from 80 to 110 s DIN4/20° C. (in accordance with withdrawn DIN 53211) may be advantageous. Furthermore, for a particularly good processability and good mechanical properties of the finished varnish as a top coat varnish a varnish can be applied which, for example, has a density in a range from ≥0.7 g/cm$^3$ to ≤1.5 g/cm$^3$, such as in a range from ≥1.0 g/cm$^3$ to ≤1.3 g/cm$^3$, for example 1.150 g/cm$^3$, which can be determined by weight measurement of the corresponding volume at 20° C. In addition, the top coat varnish can have a flow time during the application of >100/6 s at 20° C. according to ISO 2431. The abovementioned values refer to the varnish including any other ingredients, such as fillers. For example, the varnish sold under the product code HH36-0009 by BASF Coatings GmbH can be used as a top coat varnish.

Furthermore, a curing agent can be provided in the top coat varnish. As such, in principle any curing agent is suitable which is advantageous for the varnish component used. For example, an acidic curing agent can be used, for example comprising p-toluenesulfonic acid, for example with a proportion of sulfuric acid of less than 5 wt.-% and/or with a pH value of ≤1. The curing agent used can, for example, have a density in a range of ≥0.9 g/cm$^3$ to ≤1.7 g/cm$^3$, such as in a range of ≥1.1 g/cm$^3$ to ≤1.4 g/cm$^3$, for example 1.24 g/cm$^3$, which can be determined by weight measurement of the corresponding volume at 20° C. Furthermore, the curing agent can have a viscosity of less than 030/3 s at 20° C. according to ISO 2431. For example, the curing agent sold under the product number SC11-0130 1101 by the company BASF Coatings can be used.

For example, as a top coat varnish a varnish can be applied which in addition to the main varnish component includes or consists of a curing agent or a crosslinker and optionally a diluent such as water. Herein, the pure varnish can be included, for example, in 100 parts by weight, the curing agent can be included, for example, in 3-5 parts by weight and the diluent can be included in 0-5 parts by weight. As a solid content, for example, 74 wt.-% can be advantageous. The aforesaid weight parts can each differ, for example, up to 20 wt.-%, such as up to 10 wt.-%, from the abovementioned values.

In principle, an application quantity of 10-20 g/m$^2$ can be suitable for the top coat varnish.

The above-described construction of the top layer can basically be as described above in a top or wearing layer or protective layer comprising a base coat varnish and a top coat varnish of a panel, independently of the exact structure and, for example, independently of the printing subsurface described herein. In particular for an above-described panel with the above-described printing subsurface the structure of the wearing layer, however, may be advantageous in order to effectively prevent a static charging of the panel.

DRAWINGS

The drawing described herein is for illustrative purposes only of selected embodiments and not all possible implementations, and is not intended to limit the scope of the present disclosure.

FIG. 1 shows the schematic structure of an embodiment of a decorative panel according to disclosure.

DETAILED DESCRIPTION

Example embodiments will now be described more fully with reference to the accompanying drawing.

FIG. 1 shows the schematic structure of an embodiment of a decorative panel 100 according to the disclosure. On a plate-shaped carrier 110, onto which first a curing agent (not shown) may be applied, a resin layer 120 is arranged by means of which a paper or nonwoven layer 130 can be attached onto the plate-shaped carrier 110. Onto the paper or nonwoven layer 130 a printing subsurface 140 is applied.

In particular, the printing subsurface 140 can be constructed from two resin-containing layers 141, 142. In one embodiment it may be provided that the first or lower resin-containing layer 141 comprises a mixture of melamine resin and urea resin, and wherein the second or upper resin-containing layer 142 comprises ≥95% melamine resin in the resin portion.

For example, the first resin-containing layer 141 may be applied in an amount in a range from ≥10 g/m² to ≤25 g/m², and the second resin-containing layer 142 may be applied in an amount in a range from ≥20 g/m² to ≤40 g/m².

For example, the printing subsurface 140 is formed of at least one resin composition which may be present in the first resin-containing layer 141 and/or in the second resin-containing layer 142 which comprises between ≥0.5 wt.-% and ≤85 wt.-%, preferably between ≥1.5 wt.-% and ≤80 wt.-% of a solid having a mean value grain diameter $d_{50}$ between ≥0.1 μm and ≤120 μm. Herein, as a solid at least one compound of the group consisting of titanium dioxide, barium sulfate, barium oxide, barium chromate, zirconium(IV)oxide, silica, aluminum hydroxide, alumina, iron oxide, iron(III)hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose fibers or mixtures thereof may be included in the resin composition. More preferably, the resin composition includes at least titanium dioxide or cellulose fibers as a solid.

The printing subsurface 140 is optionally applied onto the decorative panel 100 according to the disclosure after a calendering step in which the paper or nonwoven layer 130 under the action of pressure and/or heat is pressed onto the resin layer 120 applied onto the plate-shaped carrier 110, or the printing subsurface is, as is not shown in FIG. 1, directly applied onto the carrier 110. In the embodiment according to FIG. 1, the resin composition of the resin layer 120 preferably penetrates only partially into the paper or nonwoven layer 130 and does not penetrate them completely.

Onto the thus produced printing subsurface 140 a paint layer 150 is applied which forms a decoration. A top and/or wearing layer 160 is applied onto the paint layer 150. The top and/or wearing layer can include haptically perceivable structures which preferably match with the decoration formed by the paint layer 150 such that the impression of a nature-like material is obtained. On the opposite side a backing layer 170 is applied in the embodiment shown.

A schematic construction of an embodiment of a decorative panel 100 according to the disclosure, which is free of a backing layer is not shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. Method for producing a printing subsurface for direct printing for producing a decorative panel, comprising the steps of:
   a) providing a carrier;
   b) optionally applying a resin layer onto the carrier;
   c) optionally applying a paper or nonwoven layer onto the; and
   d) optionally calendering the resulting layer structure, in particular at a temperature between ≥40° and ≤250° C.;
   the method comprising the further process steps:
   e) applying at least one resin composition comprising at least one resin selected from the group consisting of a melamine resin and a urea resin;
   f) drying the resin composition applied in process step e) under the action of heat;
   g) subsequently treating the resin composition applied in process step e) and dried in process step f) with UV radiation, wherein in process step e) a successive twofold application of respectively one resin composition is carried out in order to form two subsequent resin-containing layers by use of the process steps:
   e1): forming a first resin-containing layer by use of a resin composition comprising a mixture of melamine resin and urea resin; and
   e2): forming a second resin-containing layer subsequent to forming the first resin-containing layer by use of a resin composition comprising a proportion of melamine resin in the resin portion in a range of ≥95 wt.-%; and
   h) applying a decorative layer onto the printing subsurface by means of direct printing.

2. The method according to claim 1, wherein the first resin-containing layer is applied in process step e1) in an amount in a range from ≥10 g/m² to ≤25 g/m², and the second resin-containing layer is applied in process step e2) in an amount in a range from ≥20 g/m² to ≤40 g/m2.

3. Method according to any one of the preceding claims, characterized in that least one resin composition applied in process step e) includes between ≥0.5 wt.-% and ≤85 wt.-% of a solid having an average grain diameter $d_{50}$ between ≥0.1 μm and ≤120 μm, in particular wherein in process step e) at least one resin composition is applied which as a solid includes at least one compound of the group consisting of titanium dioxide, barium sulfate, barium oxide, barium chromate, zirconium(IV)oxide, silica, aluminum hydroxide, alumina, iron oxide, iron(III)hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, cellulose or mixtures thereof.

4. Method according to any one of the preceding claims, wherein in process step e) at least one resin composition is applied which has a resin proportion between ≥15 wt.-% and ≤95 wt.-%.

5. Method according to any one of the preceding claims, characterized in that in process step e) at least one resin composition is applied which comprises a curing agent, wherein the curing agent is present in the resin composition in a concentration between ≥0.05 wt.-% and ≤2.0 wt.-%.

6. The method according to claim 1, wherein prior to the application of a resin layer onto the carrier in process step b) a curing agent is applied onto the carrier, in particular wherein the surface of the, onto which the curing agent is applied, is heated preferably to a surface temperature between ≥35° C. and ≤90° C.

7. Method according to any one of the preceding claims, characterized in that in step c) a paper or nonwoven having a gram mage between ≥30 g/m2 and ≤80 g/m2, is applied onto the carrier.

8. The method according to claim 1, further comprising
i) applying a wearing or top layer onto the decorative layer.

9. The method according to claim 8, wherein the decorative layer is applied in step h) by means of flexographic printing, offset printing, screen printing, inkjet processes or laser printing processes.

10. The method according to claim 8, wherein for applying the decorative layer a radiation curable paint and/or ink is applied onto the printing subsurface.

11. A directly printed decorative panel comprising a carrier, optionally a resin layer applied onto the carrier and optionally a layer of a paper or nonwoven, wherein the decorative panel further comprises a carrier or a printing subsurface applied onto the paper or nonwoven layer, a decorative layer applied onto the printing subsurface and a top and/or wearing layer applied at least onto the decorative layer;

wherein
the printing subsurface consists of two resin-containing layers, wherein in particular the first resin-containing layer comprises a mixture of melamine resin and urea resin, and wherein the second resin-containing layer comprises ≥95 wt.-% melamine resin in the resin portion.

12. The decorative panel according to claim 11, wherein the top and/or wearing layer includes an agent for reducing the electrostatic charge, wherein the agent for reducing the electrostatic charge is a quarternary amine, in particular a quaternary alkylamine, for example (3-lauramidopropyl) trimethylammonium methyl sulfate.

13. The decorative panel according to claim 11, wherein the top and/or wearing layer includes a first layer comprising a base coat varnish and a second layer comprising a top coat varnish applied onto the first layer comprising the base coat varnish.

* * * * *